United States Patent [19]
Terll

[11] Patent Number: 6,010,389
[45] Date of Patent: Jan. 4, 2000

[54] GUN MOUNTED TURKEY CALL DEVICE

[76] Inventor: George William Terll, 1500 Hwy. 64 W., Pittsboro, N.C. 27312

[21] Appl. No.: 09/065,496

[22] Filed: Apr. 24, 1998

[51] Int. Cl.[7] .............................. A63H 5/00; F41C 23/00
[52] U.S. Cl. ......................... 446/404; 446/420; 42/71.01
[58] Field of Search ............................... 446/71, 81, 397, 446/404, 418, 420; 42/90, 71.01

[56] References Cited

U.S. PATENT DOCUMENTS

| | | | |
|---|---|---|---|
| 4,904,221 | 2/1990 | Taylor | 446/397 |
| 5,562,521 | 10/1996 | Butler et al. | 446/397 |

*Primary Examiner*—Robert A. Hafer
*Assistant Examiner*—Laura Fossum
*Attorney, Agent, or Firm*—Olive & Olive, P.A.

[57] ABSTRACT

The gun mounted turkey call device of the present invention is a slate style turkey call device integrated into a hunting gun, preferably integrated into the stock of a gun, and further includes a striker with an end striking portion to strike the plate to replicate a wild turkey call. In use, a hunter holds a gun incorporating the gun mounted turkey call device of the present invention in a near ready firing position while he or she uses the striker to strike the gun mounted turkey call device.

9 Claims, 3 Drawing Sheets

GUN MOUNTED TURKEY CALL DEVICE

BACKGROUND OF THE INVENTION

1. Field of the Invention

This invention relates to a wild game call device, and more particularly to a slate style turkey call device that is an integral component of a hunting gun. The turkey call device of the invention is preferably integrated into the stock of a gun and further includes a striker attached to a gun for immediate location and use during the hunt.

2. Background of the Prior Art

Various types of turkey call devices are currently available that enable hunters to attract wild turkey toward the hunter "calling" the turkey with a turkey call device. One type of turkey call device available in the market is the "slate-call" device. Existing slate-call devices typically utilize a substantially planar slate sound-plate and a striker. A hunter holds the plate in one hand and with the other hand strikes the sound-plate with the striker to replicate a wild turkey call.

U.S. Pat. No. 4,904,221, of Taylor, discloses a slate style turkey call consisting of a plate and a striker. The plate is typically made of hardened plastic or glass, and has a rectangular shape measuring approximately three inches long by 2⅜ inches wide. The plate is about one-fourth inch thick. The size of the plate is predicated on the hand size of the "average" hunter so that the plate may be held in the cupped hand of the user. The striker, which has a handle and a shaft extending therefrom, is brought into frictional contact with the plate. The frictional contact generates a sound that replicates a wild turkey call.

A fundamental problem with prior art slate style turkey call devices is that a hunter must use both hands to operate the call device. The hunter must hold the plate in one hand and simultaneously hold the striker in the other hand and move the striker across the plate. Therefore, a hunter using a traditional turkey call device cannot simultaneously hold the gun in a near ready firing position, because both hands are operating the turkey call and the gun is typically resting in the hunter's lap. If a turkey appears within shooting range while the hunter is using a traditional turkey call device, the hunter must reach for his gun, bring his gun up to a firing position, aim, and then fire at the turkey. "Firing position" means the hunter has placed the butt of the gun stock against his shoulder, his other hand on or near the gun barrel for support and leverage of the gun, and the other hand on the trigger. Turkeys are very sensitive to sound, have extremely good eyesight, and can detect the smallest sounds and movements of a hunter, even at relatively long distances from the hunter. Therefore, when the hunter reaches for his gun, moves his gun to its firing position from, for example, the hunter's lap, and takes aim at the turkey, the turkey has an excellent chance of detecting such activity and making its escape.

Therefore, it is an object of this invention to provide a turkey call that is operable simultaneously with a hunter holding a gun in a near ready firing position.

It is a further object of this invention to provide a turkey call device that is operable with one hand.

It is another object of this invention to provide a slate style turkey call device that comprises a turkey sound-plate mounted to the stock of a gun.

Other objects will become apparent as the description proceeds.

SUMMARY OF THE INVENTION

The gun mounted wild game call device of the present invention, in particular, is a slate-style turkey call device integrated into a hunting gun, preferably integrated into the stock of the gun, and further includes a striker with an end striking portion to strike the plate to replicate a wild turkey call. In operation, a hunter holds a gun incorporating the gun mounted turkey call device of the present invention in a near ready firing position while he or she uses the striker to strike the gun mounted turkey call device thus emitting a replicated wild turkey sound.

BRIEF DESCRIPTION OF THE DRAWINGS

FIG. 3b shows a side view of the plate shown in FIG. 3a.

DETAILED DESCRIPTION OF PREFERRED EMBODIMENTS OF THE INVENTION

Figure 1:
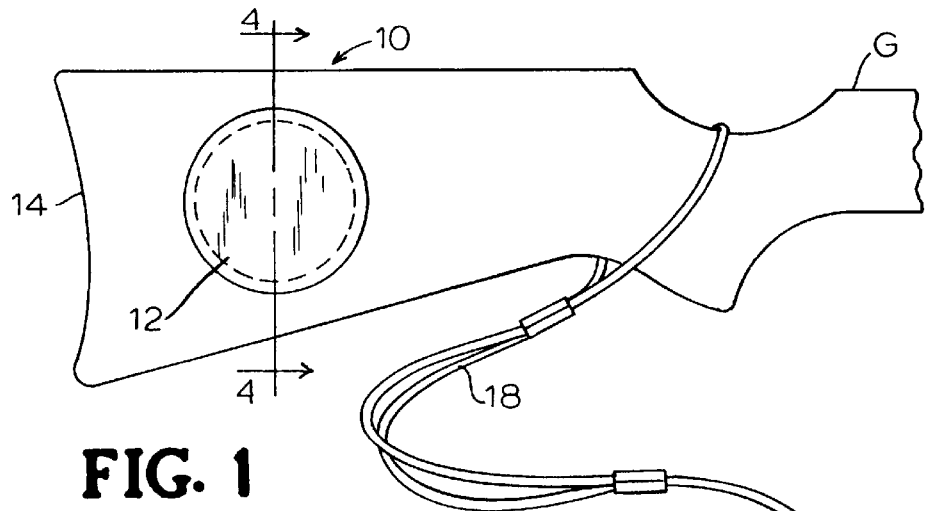
FIG. 1 is a fragmentary front-side view of a first embodiment of the gun mounted turkey call device of the present invention showing a plate mounted to the stock of a gun and a striker attached to the stock by a cord.

FIG. 1 shows a front-side view of the first embodiment of the gun mounted turkey call device of the present invention 10. A shotgun G is typically used to hunt wild turkey. The terms "shotgun," "rifle," and "gun" are used interchangeably herein. Plate 12 is mounted to the side of stock 14 closest to the hunter's hand that is to engage the trigger to fire gun G. For example, if a hunter engages the trigger with his or her right hand, then plate 12 would be mounted to the right side of gun stock 14, and vice versa, if the hunter engages the trigger with the left hand. For descriptive purposes only, the gun mounted turkey call device 10 of the present invention refers to plate 12 mounted to the right side of stock 14.

Figure 2:
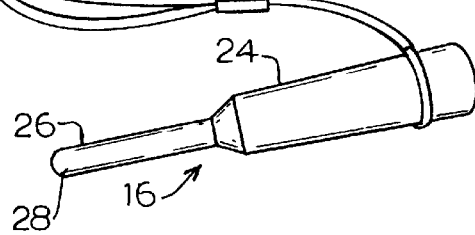
FIG. 2 is a fragmentary back-side view of the gun mounted turkey call device of the present invention shown in FIG. 1, showing a perforated screen mounted to the stock of the gun and the striker attached to the stock by a cord.
Figure 2:
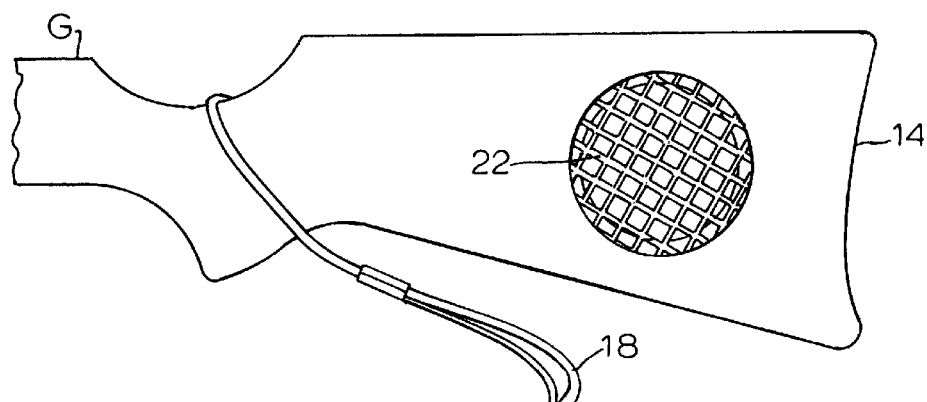
Figure 3A:
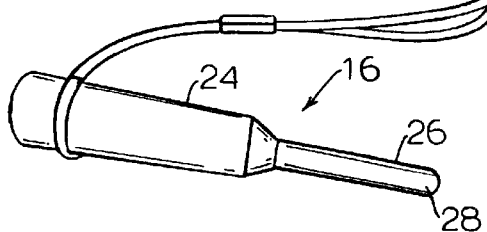
FIG. 3a shows a top view of the plate of the invention.
Figure 3A:
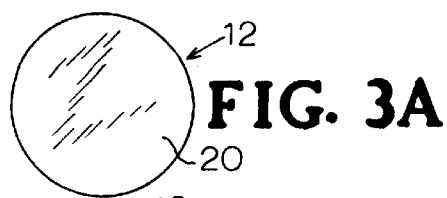
Figure 3B:
Figure 4:
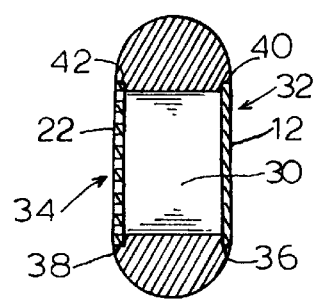
FIG. 4 is a cross-sectional view along line 4—4 of FIG. 1 showing the plate mounted within a first counterbore and a screen wire mounted within a second counterbore.

A striker 16 is shown attached to gun stock 14 by a cord 18, such that striker 16 is located near the plate 12 and can be easily located and used during the hunt with a minimum of hunter movement. Plate 12 is preferably made of glass but can be made from hardened slate, aluminum, or from many other materials. Plate 12 has a frictional surface 20, as known in the art, capable of replicating the sound of wild turkey when it is struck by striker 16 (See FIGS. 3a and 3b). Plate 12 is disc shaped and is approximately 3 inches in diameter and one-eighth inch thick. A perforated screen 22 is mounted to the left side of gun stock 14 of gun G distant and in a position opposed to plate 12 (FIGS. 2 and 4). Although perforated screen 22 is preferably made of wire, it can be made of any harden perforated material known in the art. Plate 12 and perforated screen 22 can be a variety of sizes and shapes, i.e., square or rectangular provided, however, that plate 12 and perforated screen 22 must be of a size and shape that can be effectively and unobtrusively mounted or otherwise integrated into gun G, preferably to stock 14 of gun G as shown in FIGS. 1, 2 and 4. Plate 12 and perforated screen 22 (FIGS. 1, 2, and 4) are preferably flush with the surface of stock 14 of gun G so that plate 12 and screen 22 will not interfere with accurate and safe operation of gun G.

As illustrated in FIGS. 1 and 2, striker 16 consists of typically a cylindrical shaped handle 24 and shaft 26 with a dome-shaped strike tip 28. Striker 16 is preferably made of wood, but can be made of Plexiglas or other plastic materials, and some metals, such as aluminum, that will not damage plate 12. Striker 16 is approximately seven inches long, although its size and shape can obviously vary substantially.

FIGS. 1, 2 and 4 illustrate a first embodiment of the gun mounted turkey call device 10 of the invention with a cylindrical shaped through-hole 30 extending through stock 14 to form first and second openings 32, 34. A first counterbore 36 resides at first opening 32 and a second counterbore 38 resides at second opening 34. The diameters of first and second counterbores 36, 38 are larger than the diameter of through-hole 30 to form continuous ledges 40, 42, respectively.

As shown in FIG. 4, plate 12 and perforated screen 22 may be permanently mounted within counterbores 36, 38, respectively and are supported on ledges, 40, 42, respectively. Perforated screen 22 and plate 12 may be glued or otherwise permanently attached within counterbores by numerous methods known in the art. Plate 12 may also be releasably mounted within counterbores 36 by methods well known to those skilled in the art, for eventual replacement of a defective or overly used plate 22. The depth of first and second counterbores 36, 38 are slightly greater or substantially the same as the thickness of plate 12 and perforated screen 22, respectively, so that plate 12 and perforated screen 22 are slightly recessed or at least flush with the surface of gun stock 14, so that the gun mounted turkey call device 10 does not interfere with accurate and safe operation of gun G. Perforated screen 22 prevents foreign objects from entering through-hole 30, preventing possible damage to plate 12. Through-hole 30 having perforated screen 22 on one end and plate 12 on the other forms a sound chamber that projects the sound made from the turkey call when the striker 16 is moved against plate 12 causing a fuller and louder sound to emanate from the gun mounted turkey call device 10 of the invention.

In the first embodiment as shown in FIGS. 1–4, first and second counterbores 36, 38, are substantially the same configuration. However, the first and second counterbores 36, 38 can substantially vary in size and shape to correspond with the configurations of plate 12 and perforated screen 22, respectively.

Figure 5:
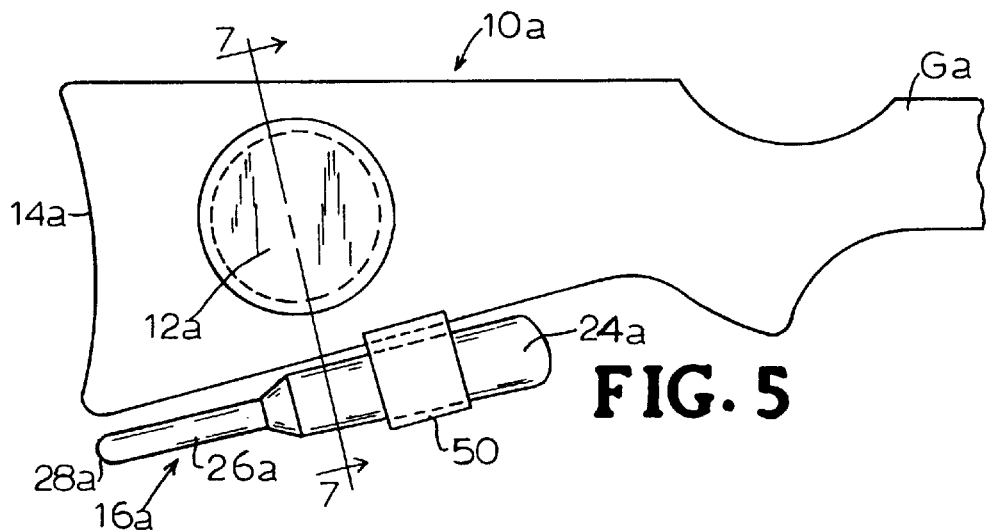
FIG. 5 is a fragmentary front-side view of a second embodiment of the gun mounted turkey call device of the present invention showing a plate mounted to the stock of a gun and a striker holder attached to the stock with a striker sitting inside of the striker holder beneath the stock of the gun.
Figure 6:
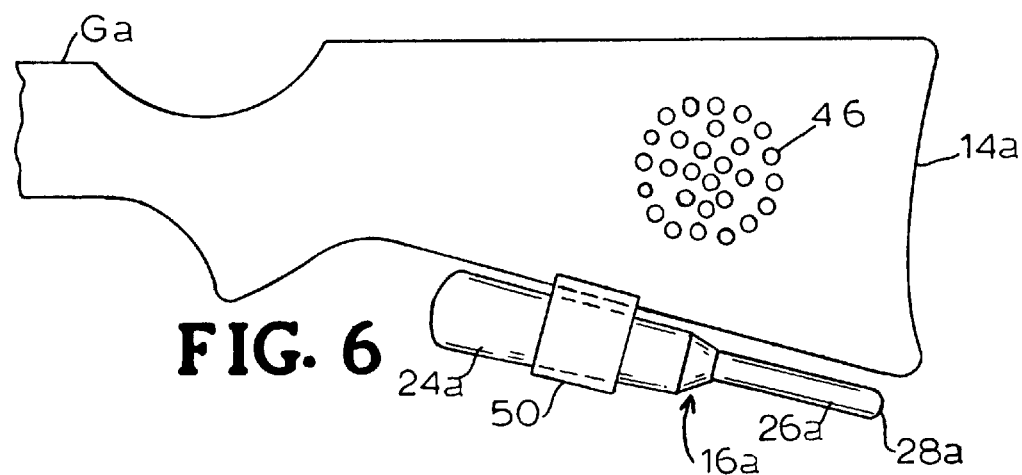
FIG. 6 is a fragmentary back-side view of the gun mounted turkey call device of the present invention shown in FIG. 5, showing a plurality of through-holes in the gun stock.
Figure 7:
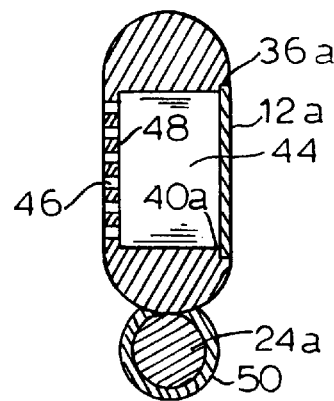
FIG. 7 is a cross-sectional view along line 7—7 of FIG. 5 showing the plate, a counterbore and the plurality of through-holes extending from the bottom surfaces of the counterbore through the opposed side of the gun stock.

In a second embodiment of the gun mounted turkey call 10a, as shown in FIGS. 5, 6 and 7, gun stock 14a includes a chamber 44. A plurality of small through-holes 46 extend from floor 48 of chamber 44 through the opposed side of gun stock 14a. The plurality of through-holes 46 allows the sound made by the gun mounted turkey call to be carried to both sides of stock 14a, thereby generating a full sound. In this embodiment, as shown in FIG. 7, plate 12a is mounted within the first counterbore 36a and is supported by ledge 40a, as described in the first embodiment (FIGS. 1 and 4). The size and shape of through holes 46 can vary substantially, as well as the depth and size of chamber 44. A striker holder 50 is mounted to the lower portion of gun stock 14a of gun Ga to hold striker 16a immediate to stock 14a so that the hunter will have easy access to striker 16a.

Figure 8:
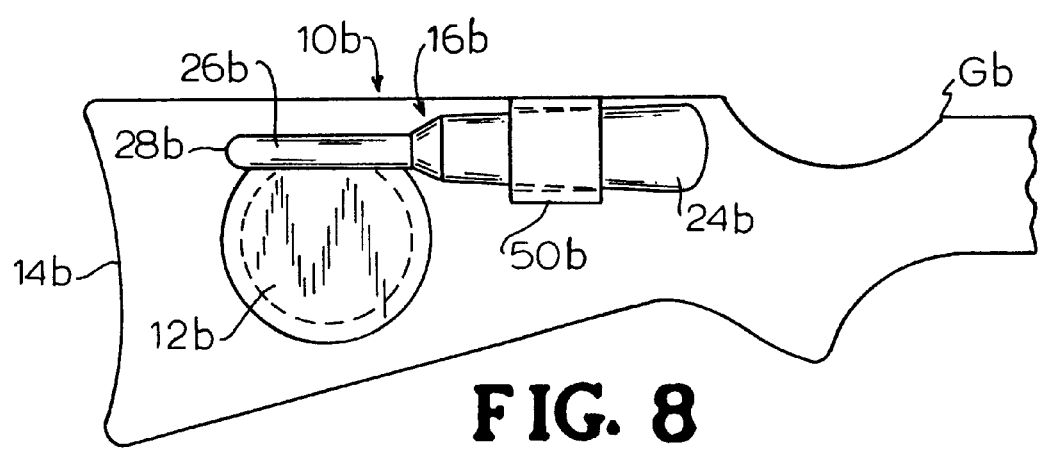
FIG. 8 is a fragmentary front side view of a third embodiment of the gun mounted turkey call device showing the striker holder attached to the side of the gun stock and the striker sitting inside of the striker holder.

In a third embodiment of the gun mounted turkey call device 10b (FIG. 8), striker holder 50b is mounted to the top portion of gun stock 14b of gun Gb to hold striker 16b immediate to plate 12b when the hunter is not operating the gun mounted turkey call device 10b.

Figure 9:
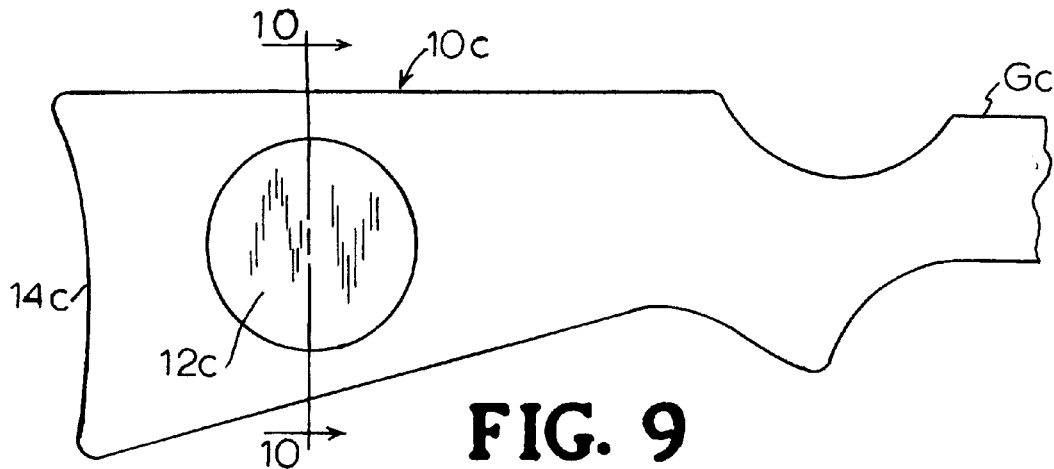
FIG. 9 is a fragmentary front-side view of a fourth embodiment of the gun mounted turkey call device showing a plate mounted to the stock of a gun.
Figure 10:
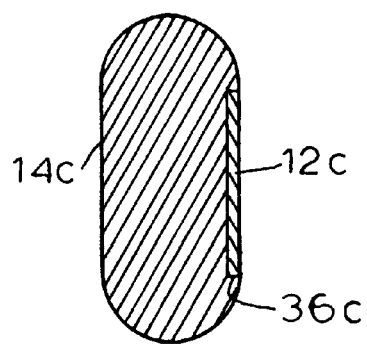
FIG. 10 is a cross-sectional view along line 10—10 of FIG. 9 showing the plate mounted to the gun stock.

In a fourth embodiment of the gun mounted turkey call device 10c, as shown in FIGS. 9 and 10, plate 12c is mounted within counterbore 36c of stock 14c. As illustrated the fourth embodiment does not include through-hole 30 or perforated screen 22. Striking plate 12c of the fourth embodiment generates a turkey call that is easily heard and recognized by wild turkeys.

In a fifth embodiment (not shown) of the gun mounted turkey call device 10 of the present invention, a portion of the hunting gun, preferably a portion or all of gun stock 14, is formed of a material having frictional surface that when struck by striker 16 generates a turkey call. For example, the fifth embodiment includes making the entire gun stock from a material having a frictional surface capable of producing a turkey call when struck by striker 16. In all embodiments of the present invention, the portion of gun G that integrates a turkey call frictional surface therein must be positioned so that the hunter can strike it with striker 16, while holding gun G in a near ready firing position.

When operating the gun mounted turkey call 10, the hunter can hold his gun G in a near ready firing position, which is a significant advantage over traditional turkey call devices. A near ready firing position means the hunter has the butt of stock 14 of gun G against his shoulder and has one hand holding the other end portion of gun to support and aim it at the target, i.e., wild turkey. The remaining hand is free to use striker 16 to strike the gun mounted turkey call device 10 of the invention. For optimum sound, the hunter holds striker 16 approximately at a right, ninety degree angle to the frictional surface 20 of plate 12 and strikes the dome-shaped strike tip 28 along frictional surface 20 of plate 12. The hunter may repeatedly strike plate 12 with strike tip 28 to better replicate the call of a wild turkey. For example, moving striker 16 in a manner as if to strike a match produces a "cluck" sound, a continuous series of "O's" produces a "yelp." Once a wild turkey appears in firing range, the hunter simply releases striker 16 and moves his hand to the trigger of gun G, which is already in a near shooting position. As is known in the art, if frictional surface 20 of plate 12 becomes frictional because of being contiuously struck by striker 16, plate 12 can be sanded, from time to time as needed, using a piece of sandpaper or any other material with a course surface until plate 12 has formed its frictional surface.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention as set forth in the appended claims.

What is claimed is:

1. A gun having a wild game call integrally mounted therein, comprising:

a gun stock having an outer surface;

a wild game call having a chamber extending at least partially through said gun stock and a friction plate mounted within the chamber and flush with the outer surface of said gun stock; and wherein the wild game call is designed to replicate the sound of wild game when a striker is moved across the surface of the friction plate thereby causing the chamber to resonate the replicated sound.

2. An apparatus for calling wild game as claimed in claim 1, wherein said chamber further comprises:

a. a through-hole extending through said gun stock to form first and second openings in said gun stock;

b. first and second counterbores formed adjacent first and second openings respectively, wherein said plate is mounted within said first counterbore; and c. a screen mounted within said second counterbore.

3. An apparatus for calling wild game as claimed in claim 1 wherein said plate is disc shaped.

4. An apparatus for calling wild game as claimed in claim 1 wherein a striker holder is mounted to said gun stock.

5. An apparatus for calling wild game as claimed in claim 1, further comprising a striker connected to said gun stock.

6. An apparatus for calling wild game as claimed in claim 5 wherein said striker is attached to said gun stock by a cord.

7. An apparatus for calling wild game as claimed in claim 5 wherein said striker is made of wood.

8. An apparatus for calling wild game as claimed in claim 1 wherein said plate is made of glass.

9. An apparatus for calling wild game as claimed in claim 1 wherein said gun stock further comprises:

a. said chamber having a floor and said floor having a plurality of holes extending therethrough; and b. a counterbore formed adjacent said first opening, wherein said plate is mounted within said counterbore.

* * * * *